United States Patent [19]

Tanimoto et al.

[11] Patent Number: 4,956,413
[45] Date of Patent: Sep. 11, 1990

[54] RUBBER COMPOSITIONS

[75] Inventors: Yoshio Tanimoto; Kohichi Iketani, both of Chiba, Japan

[73] Assignee: Sumitomo Chemical Company, Limited, Osaka, Japan

[21] Appl. No.: 325,534

[22] Filed: Mar. 20, 1989

[51] Int. Cl.$^5$ .............. C08L 9/00; C08L 23/16; C08L 23/26; C08L 23/32
[52] U.S. Cl. .................... 525/192; 525/211; 525/237; 525/331.8
[58] Field of Search ............. 525/192, 211, 237, 331.8

[56] References Cited

U.S. PATENT DOCUMENTS

| | | | |
|---|---|---|---|
| 3,359,221 | 12/1967 | Schoenbeck | 525/192 |
| 3,451,962 | 6/1969 | Auler et al. | |
| 3,891,724 | 6/1975 | Yaeda et al. | |
| 4,089,820 | 5/1978 | Wright | 525/193 |
| 4,137,350 | 1/1979 | Blaskiewicz et al. | |

FOREIGN PATENT DOCUMENTS

| | | | |
|---|---|---|---|
| 910520 | 9/1972 | Canada | 525/331.8 |
| 188097 | 7/1986 | European Pat. Off. | |
| 2641518 | 3/1977 | Fed. Rep. of Germany | |
| 2209792 | 7/1974 | France | |
| 46190 | 8/1971 | Japan | |
| 6114345 | 7/1986 | Japan | |

*Primary Examiner*—Carman J. Seccuro
*Attorney, Agent, or Firm*—Cushman, Darby & Cushman

[57] ABSTRACT

The present invention provides a rubber composition which comprises 100 parts by weight of ethylene-α-olefin-non-conjugated diene copolymer rubber, 5–40 parts by weight of solid diene rubber and 4–15 parts by weight of sulfur, the butadiene content of said solid diene rubber being 50% by weight or more, the butadiene portions of said solid diene rubber having 40% or more of 1,2 bonds based on all the bonds of said portion, and the ratio of weight-average molecular weight to number-average molecular weight being 2 or less. The rubber composition is a vulcanized rubber excellent in properties such as hardness and strength.

6 Claims, No Drawings

RUBBER COMPOSITIONS

This invention relates to a rubber composition high in hardness.

More specifically, this invention relates to a rubber composition comprising ethylene α-olefin·non-conjugated diene copolymer rubber (abbreviated to "ethylene·α-olefin rubber" hereinafter), which is high in hardness and has excellent heat resistance and weather resistance.

A rubber composition high in hardness, which comprises an ethylene·α-olefin rubber, a liquid diene rubber such as liquid polybutadiene rubber and a large amount of sulfur, is disclosed by the present inventors in U.S. Pat. No. 4,708,992 and Japanese Patent Publications (Kokai) Nos. 60-262842 and 62-135552.

The rubber composition, however, has a problem on handling of the liquid diene rubber upon weighing and mixing processes because of viscousness of the liquid diene rubber used.

U.S. Pat. No. 4,137,350 discloses a rubber composition high in hardness in which a solid diene rubber is used in place of a liquid diene.

This patent mentions that the solid diene rubber includes polyisoprene rubber, polybutadiene rubber, polychloroprene rubber, butadiene·styrene copolymer rubber, butadiene·acrylonitrile copolymer rubber, but does not refer to such specific diene rubbers as are used in the present invention.

As a result of the present inventors' intensive research conducted to find out a specific solid diene rubber which provides a rubber composition with high hardness and high strength without use of the abovementioned liquid diene rubber, the present invention is completed.

The present invention relates to a rubber composition which comprises 100 parts by weight of ethylene·α-olefin rubber, 5–40 parts by weight of solid diene rubber and 4–15 parts by weight of sulfur, the butadiene content of said solid diene rubber being 50% by weight or more, the butadiene portions of said solid diene rubber having 40% or more of 1,2 bonds based on all the bonds thereof, and the ratio of weight-average molecular weight to number-average molecular weight (abbreviated to "Q value" hereinafter) being 2 or less.

The present rubber composition has excellent properties, that it is, high hardness and strength relative to other vulcanized rubbers.

In the present invention, the ethylene·α-olefin rubber is a copolymer which comprises ethylene, at least one α-olefin and at least one non-conjugated diene. The α-olefin includes propylene, 1-butene, 1-pentene and 1-hexene. The non-conjugated diene includes dicyclopentadiene, ethylidenenorbornene, 1,4-hexadiene, methyltetrahydroindene and methylnorbornene.

The solid diene rubber used in the present invention is are in which its butadiene content is 50% by weight or more, preferably 60% by weight or more, its butadiene portions have 40% or more, preferably 50% or more of 1,2 bonds based on the total bonds of said portion, and Q value being 2 or less.

Preferable examples of the solid diene rubber are polybutadiene rubber and styrene·butadiene rubber.

The solid diene rubber may be produced by any polymerization process, but is commonly produced by anion polymerization. The solid diene rubber may be one which is produced by terminal coupling reaction by use of silicon chloride, tin chloride and the like.

If the solid diene rubber has a butadiene content of less than 50 % by weight, it becomes hard at room temperature, its roll processability degrades, and hardness of the final vulcanized rubber composition changes greatly depending upon temperature.

If the butadiene portion of the solid diene rubber has less than 40% of 1,2-bonds based on the total bonds of the portion, strength of the final vulcanized rubber composition becomes insufficient.

If Q value of the solid diene rubber is more than 2, hardness of the final vulcanized rubber composition is insufficient.

In the present invention, Q value is obtained from a molecular weight distribution which is obtained by a liquid chromatography at 40 ° C. with tetrahydrofuran (THF).

Amount of the solid diene rubber added is 5–40 parts by weight, preferably 10–30 parts by weight, most preferably 13–27 parts by weight based on 100 parts by weight of the ethylene·α-olefin rubber.

If the amount of the solid diene rubber added is less than 5 parts by weight, hardness is not sufficiently increased. If the amount is more than 40 parts by weight, tensile strength is lowered and compression permanent set and the like are deteriorated.

Amount of the sulfur added is 4–15 parts by weight, preferably 5–10 parts by weight, most preferably 5–8 parts by weight based on 100 parts by weight of the ethylene·α-olefin rubber.

If the amount of the sulfur added is less than 4 parts by weight sufficiently, high hardness is not obtained. If the amount is more than 15 parts by weight, the degree of crosslinking markedly increases and sufficiently high hardness can be obtained while the breaking extension of vulcanized rubbers decreases. Moreover bloom of sulfur occurs at unvulcanized condition.

As mentioned above, the rubber composition of the present invention comprises an ethylene·α-olefin rubber, a solid diene rubber and sulfur. If desired, various secondary materials may be added to the composition known as compounding ingredients for rubbers such as reinforcing agents, fillers, softeners, processing aids, antifoaming agents, zinc oxide, stearic acid, vulcanization accelerators, etc.

The rubber composition of the present invention may be vulcanized by any method, such as press vulcanization, steam vulcanization, injection modling, hot air vulcanization, UHF vulcanization, LCM vulcanization, PCM vulcanization, etc.

Because of the superior performances of the present rubber composition, it has a wide range of uses, such as for automobile parts, industrial parts, construction materials. Uses for automobile parts include packings, hoses, channel rubber, glass run rubber, weatherstrips, hard solid rubber portions in composites of a soft rubber and a hard solid rubber, solid rubber portions in composites of a solid rubber and sponge rubber which are applied to door seals and trunk seals, etc. Uses for industrial parts include rubber rolls, sealing materials, packing, etc. Uses for construction materials include setting blocks, rubber tiles, gaskets, etc.

The following non-limiting examples further illustrate this invention.

In these examples, the Q value of solid diene rubbers was obtained from a molecular weight distribution which was measured at 40° C. by HLC-802UP manufactured by TOYO SODA CO. LTD. using columns of $10^3$, $10^4$, $10^6$, and $10^7$ as distribution columns, a refractometer as detector and tetrahydrofuran (THF) as solvent. Properties of vulcanized rubbers were measured in accordance with JIS K 6301.

no diene rubber and the vulcanized rubbers of Comparative Examples 2-4 which contain diene rubbers falling outside the present invention are not satisfactory in terms of strength and/or hardness.

TABLE 1

|  |  | Examples of Invention |  |  |  |  | Comparative Examples |  |  |  |
|---|---|---|---|---|---|---|---|---|---|---|
|  |  | 1 | 2 | 3 | 4 | 5 | 1 | 2 | 3 | 4 |
| Formulated ingredient (1) | Ethylene.Propylene Rubber I *1 | 100 | 100 | 100 | 50 | 100 | 100 | 100 | 100 | 100 |
|  | Ethylene.Propylene Rubber II *2 | — | — | — | 50 | — | — | — | — | — |
|  | Polybutadiene Rubber (A) *3 | — | — | — | — | — | — | — | 20 | — |
|  | Polybutadiene Rubber (B) *4 | — | — | — | — | — | — | — | — | 20 |
|  | Polybutadiene Rubber (C) *5 | 15 | 20 | 30 | — | 20 | — | — | — | — |
|  | Styrene Butadiene Rubber (D) *6 | — | — | — | 20 | — | — | — | — | — |
|  | Natural Rubber (RSS #1) | — | — | — | — | — | — | 20 | — | — |
|  | FEF Carbon Black | 100 | | | | | | | | |
|  | Paraffinic process oil | 5 | | | | | | | | |
|  | Zinc oxide | 5 | → | → | → | → | → | → | → | → |
|  | Stearic acid | 1 | | | | | | | | |
|  | Vesta ®-BS *7 | 8 | | | | | | | | |
| Formulated ingredient (2) | Soxinol ® CZ *8 | 2.5 | | | | | | | | |
|  | Soxinol ® BZ *9 | 1 | → | → | → | → | → | → | → | → |
|  | Soxinol ® TT *10 | 0.5 | | | | | | | | |
|  | Sulfur | 6 | 6 | 10 | 4 | 6 | 1.5 | 6 | 6 | 6 |
| Properties of vulcanized rubber |  |  |  |  |  |  |  |  |  |  |
| Tensile strength (Kgf/cm$^2$) |  | 155 | 151 | 156 | 165 | 157 | 185 | 138 | 127 | 167 |
| Elongation (%) |  | 170 | 130 | 120 | 190 | 170 | 180 | 170 | 180 | 150 |
| Hardness (JIS-A) |  | 93 | 95 | 96 | 93 | 94 | 85 | 86 | 86 | 90 |

Note
In Examples 2-5 and Comparative Examples 1-4, Formulation of FEF carbon Black to Soxinol TT inclusive were the same as in Example 1.

*1 Ethylene/propylene/ethylidene norbornene copolymer rubber
Mooney viscosity (ML$_{1+4}$ 100° C.): 35
Ethylene content (wt. %): 35
Iodine value: 15

*2 Ethylene/propylene/ethylidene norbornene copolymer rubber
Mooney viscosity (ML$_{1+4}$ 120° C.): 65
Ethylene content (wt. %): 30
Iodine value: 12

*3 Polybutadiene rubber (A)
Mooney viscosity (ML$_{1+4}$ 100° C.): 55
1,2 bond content (%): 26
Q value: 1.4

*4 Polybutadiene rubber (B)
Mooney viscosity (ML$_{1+4}$ 100° C.): 45
1,2 bond content (%): 75
Q value: 2.3

*5 Polybutadiene rubber (C)
Mooney viscosity (ML$_{1+4}$ 100° C.): 40
1,2 bond content (%): 80
Q value: 1.5

*6 Styrene butadiene rubber (D)
Mooney viscosity (ML$_{1+4}$ 100° C.): 75
Butadiene content (wt. %): 70
1,2 bond content of butadiene portion (%): 70
Q value: 1.7

*7 Antifoaming agent manufactured by Inoue Sekkai Co., Ltd.
*8, *9 & *10 Valucanization accelerators manufactured by Sumitomo Chemical Co., Ltd.

EXAMPLES 1-5 AND COMPARATIVE EXAMPLES 1-4

The formulated ingredients(1) as shown in Table 1 were mixed in the amounts (parts by weight) as shown in Table 1 by a Banbury mixer. With the mixture were mixed the formulated ingredients (2) as shown in Table 1 in the amounts as shown in Table 1 by a roll to obtain a compound. The obtained compound was vulcanized at 160° C. for 20 minutes by a vulcanizing press.

Properties of the obtained vulcanized rubber are also shown in Table 1.

It can be seen from Table 1 that the vulcanized rubber compositions of Examples 1-5 which contain diene rubbers falling in the scope of the present invention have sufficient strength and hardness, while the vulcanized rubber of Comparative Example 1 which contains

We claim:
1. A rubber composition which comprises 100 parts by weight of ethylene-α-olefin-non-conjugated diene copolymer rubber, 5-40 parts by weight of solid diene rubber and 4-10 parts by weight of sulfur, the butadiene content of said solid diene rubber being 50% by weight or more, the butadiene portions of said solid diene rubber having 40% or more of 1,2 bonds based on all the bonds of said portion, and the ratio of weight-average molecular weight to number-average molecular weight being 2 or less.

2. A rubber composition according to claim 1, wherein said solid diene rubber is polybutadiene rubber or styrene butadiene rubber.

3. A rubber composition according to claim 1, which comprises 10-30 parts by weight of the solid diene rubber.

4. A rubber composition according to claim 1, which comprises 13-27 parts by weight of the solid diene rubber.

5. A rubber composition according to claim 1, wherein said ethylene-α-olefin-non-conjugated diene copolymer rubber comprises ethylene, at least one α-olefin selected from the group consisting of propylene, 1-butene, 1-pentene and 1-hexene, and at least one non-conjugated diene selected from dicyclopentadiene, ethylidenenorbornene, 1,4-hexadiene, methyltetrahydroindene and methylnorbornene.

6. A rubber composition according to claim 1, which comprises 5-8 parts by weight of sulfur.

* * * * *